United States Patent [19]

Herschede

[11]  4,423,626
[45]  Jan. 3, 1984

[54] METHOD OF DETERMINING WIND DIRECTION FOR HUNTERS

[76] Inventor: Dean Herschede, 8560 Donna La., Cincinnati, Ohio 45236

[21] Appl. No.: 248,312

[22] Filed: Mar. 27, 1981

[51] Int. Cl.$^3$ ............................................. G01W 1/00
[52] U.S. Cl. ...................................... 73/188; 116/214; 116/273; 43/1
[58] Field of Search .................. 73/188; 116/214, 264, 116/DIG. 7, 273; 43/1; 424/40

[56] References Cited

U.S. PATENT DOCUMENTS

| | | | |
|---|---|---|---|
| 2,311,199 | 2/1943 | Astradsson | 73/189 |
| 2,320,359 | 6/1943 | Gatty | 73/188 |
| 2,501,047 | 3/1950 | Gustafsson | 91/45 |
| 3,088,874 | 5/1963 | Geary | 424/46 |
| 3,112,645 | 12/1963 | Glass | 73/188 |
| 3,658,719 | 4/1972 | McConnaughey | 252/359 |
| 4,186,502 | 2/1980 | Foster | 41/1 |

FOREIGN PATENT DOCUMENTS 532495  9/1931  Fed. Rep. of Germany ...... 116/214

Primary Examiner—S. Clement Swisher
Assistant Examiner—J. Chapman
Attorney, Agent, or Firm—Frost & Jacobs

[57] ABSTRACT

A method for avoiding detection by game animals by scent through establishing wind direction to insure that the hunter is positioned downwind from the animal. In the method, a small quantity of a hydrophobic material such as unscented raw talc powder, which may be mixed with a natural masking scent material, is sprayed into the air in a relatively small cloud by means of a hand-held manually operated squeeze bottle. The direction of travel in the air of the cloud of material may then be used to establish wind direction. The material is such as to be undetectable by smell by the animal, and the size and characteristics of the powder cloud is such as to be visually undetectable by the animal at a distance.

6 Claims, No Drawings

METHOD OF DETERMINING WIND DIRECTION FOR HUNTERS

SUMMARY OF THE INVENTION

It has been a constant source for frustration for hunters, particularly hunters of large game, that sudden wind shifts or improper positioning will place the hunter upwind from the animal. Various methods have been proposed for avoiding this problem.

For example, it has been proposed that the hunter throw into the air a handfull of grass or dirt to determine wind direction. However, the sudden movement of the hunter as well as the sudden appearance of a cloud of dark material may be easily detectable by the animal. It has also been proposed, for example in U.S. Pat. No. 3,112,645 issued Dec. 3, 1963 to T. D. Glass, that a chemical smoke dispenser be mounted on the barrel of the hunter's rifle to provide an indication of wind direction. However, under some circumstances, particularly if the hunter is already positioned partially upwind from the animal, the chemical odor may be easily detectable by the animal.

The present invention is directed to a method for avoiding detection by game animals, particularly by scent, through establishing wind direction to insure that the hunter is positioned downwind from the animal. In a preferred embodiment, a relatively small cloud of finely divided powder-like hydrophobic material, such as unscented raw talc, which is undetectable by smell by the animal, is dispersed into the air by means of a small manually operated squeeze bottle. The direction of travel in the air of the cloud of material may then be used to establish wind direction. The size of the cloud is such as to be visually undetectable by the animal located some distance away, but easily visible by the hunter. The material may also include a natural masking scent particularly adapted to the area in which the hunter is operating such as acorn, pine, apple, cedar or the like.

Further features of the invention will become apparent from the detailed description which follows.

DETAILED DESCRIPTION

In a preferred embodiment, the method of the present invention is carried out by means of a small quantity of finely divided powder-like material which is sprayed into the air in a relatively small cloud by means of a conventional hand-held manually operated squeeze bottle, nebulizer, atomizer or the like. The bottle should be small enough so as to be easily carried by the hunter and available for instant use, but large enough to contain sufficient material to permit a plurality of spraying. The construction of the dispenser should be such so as to produce a relatively small cloud of the dispersed material in order to be undetectable at a distance by the animal.

It is also important that the material used in the dispenser be undetectable by smell by the animal. It is further desirable that the material be hydrophobic in order that the material may be dispersed in a cloud even when wetted or under conditions of high humidity. It has been found that these requirements are met by the use of unscented raw talc powder, and in particular magnesium trisilicate. The size of the talc particles is such that a small cloud may be produced which is readily visible to the hunter, but virtually invisible from a distance. Consequently, the animal will be unable to detect the use of the spray dispenser by either sight or smell.

In some instances, it may be desirable to include with the talc material a natural masking scent which will serve to cover the hunter's human scent, but will not cause the animal to become alarmed. For example, such a masking scent will have an odor identifiable by the animal, and may preferably be chosen from the group of odors consisting of acorn, pine, apple or cedar, depending upon the vegitation growth in the area in which the hunter is hunting.

In use, the squeeze bottle is operated to permit the air within the bottle, which serves as a gaseous propellant, to expel a small quantity of the material into the air where it is dispersed in a relatively small cloud. The hunter may then observe the direction of travel in the air of the cloud of material in order to establish wind direction. As noted hereinabove, the use of a natural masking scent also serves to protect the hunter from detection by the animal.

It will be understood that various changes in the details, materials, steps and arrangements of parts, which have been herein described and illustrated in order to explain the nature of the invention, may be made by those skilled in the art within the principle and scope of the invention as expressed in the appended claims.

The embodiments of the invention in which an exclusive property or privilege is claimed are as follows:

1. A method for avoiding detection by game animals by scent of a hunter through establishing wind direction to insure that the hunter is positioned downwind from the animal, comprising the steps of providing a quantity of finely divided powder-like hydrophobic material undetectable by smell by the animal; furnishing said material with a natural masking scent having an odor chosen from the group consisting of acorn, pine, apple or cedar, said scent being identifiable by the animal and serving to mask the scent of the hunter; dispersing into the air in a relatively small cloud at a location removed from the animal a quantity of said material; and observing the direction of travel in the air of said cloud of material to establish wind direction.

2. The method according to claim 1 wherein said material is dispersed by spraying.

3. The method according to claim 2 wherein said material is dispersed by a gaseous propellant under pressure.

4. The method according to claim 3 wherein said propellant is air, said material being sprayed by manually squeezing a hand-held spray container holding a quantity of the material.

5. The method according to claim 1 including limiting the size of said cloud so that it is visually undetectable by the animal at a distance.

6. The method according to claim 1 including furnishing unscented raw talc as a portion at least of said material.

* * * * *